United States Patent [19]

Lenz

[11] Patent Number: 4,606,695
[45] Date of Patent: Aug. 19, 1986

[54] MULTIPLE AXIS ROBOT ARM
[75] Inventor: John O. Lenz, Coon Rapids, Minn.
[73] Assignee: Kurt Manufacturing Company, Inc., Minneapolis, Minn.
[21] Appl. No.: 611,685
[22] Filed: May 18, 1984
[51] Int. Cl.$^4$ ............................ B25J 9/00; B25J 17/00
[52] U.S. Cl. .................................. 414/735; 74/665 A; 901/2; 901/23; 901/25; 901/28; 901/29
[58] Field of Search .................... 414/4, 735, 739, 730, 414/4; 901/23–29, 38, 39, 2; 74/665 A, 417

[56] References Cited

U.S. PATENT DOCUMENTS

| | | | |
|---|---|---|---|
| 2,861,701 | 11/1958 | Bergsland et al. | 214/1 |
| 3,247,978 | 4/1966 | Neumeier | 214/1 |
| 3,817,403 | 6/1974 | Glachet et al. | 214/1 |
| 3,922,930 | 12/1975 | Fletcher et al. | 74/665 B |
| 3,985,238 | 10/1976 | Nakura et al. | 214/1 |
| 4,047,448 | 9/1977 | Pardo et al. | 74/417 |
| 4,064,656 | 12/1977 | Zeidler | 51/426 |
| 4,068,536 | 1/1978 | Stackhouse | 74/417 |
| 4,068,763 | 1/1978 | Fletcher et al. | 214/1 |
| 4,188,166 | 2/1980 | Moreau et al. | 414/735 |
| 4,332,147 | 6/1982 | Grech | 464/109 |
| 4,360,886 | 11/1982 | Kostas et al. | 364/551 |
| 4,367,532 | 1/1983 | Crum et al. | 364/513 |
| 4,499,790 | 2/1985 | Helms | 901/26 X |
| 4,502,347 | 3/1985 | Norris et al. | 74/417 |

OTHER PUBLICATIONS

"Bevel Gears Make Robot's 'Wrist' More Flexible," published in *Machine Design*, p. 55, Aug. 12, 1982.

*Primary Examiner*—Donald W. Underwood
*Attorney, Agent, or Firm*—Kinney & Lange

[57] ABSTRACT

A robot assembly includes a support for mounting at least two arm portions and a wrist portion about an upright axis. The wrist has three axes of movement that are mutually perpendicular, and they are controlled by a single motor through an arrangement of electromagnetic clutches and gears so that one motor controls movement about all three axes of movement of the wrist. Additionally, gear drives are used for other movements on the robot arm to provide movement about seven independent axes in the arrangement shown with only two drive motors.

12 Claims, 4 Drawing Figures

MULTIPLE AXIS ROBOT ARM

BACKGROUND OF THE INVENTION

1. Field of the Invention

The present invention relates to robot arms and wrist assemblies therefor.

2. Description of the Prior Art

In the prior art there have been various robots designed for use. For example, in Machine Design Magazine, of Aug. 12, 1982, on Page 55, there is an illustration of a robot sold by the Bendix Corporation, Robotics Division of Southfield, Mich. utilizing bevel gear drives for a wrist. The details shown are not extensive, but it does show bevel gears in an arrangement that moves the tool holder shaft through a differential action.

Likewise, U.S. Pat. No. 4,068,536 shows a type of a manipulator hand that provides for three axis movements in a wrist, as well as drives for mounting a robot arm on which the wrist is mounted.

U.S. Pat. No. 4,047,448 shows a robot head that provides for movement of a wrist member about three mutually perpendicular axes, utilizing three separate hydraulic motors for drive and gear trains for accomplishing such drive.

U.S. Pat. No. 4,332,147 shows an adjustable power transmitting device having an input and output shaft which are coupled together by drive gears, and which includes a housing that is rotatably mounted and is adjustable to a plurality of different positions.

A drive is shown in U.S. Pat. No. 3,922,930, requires few drive motors but substantial gear and shafting, and typical manipulator hand operators are shown in U.S. Pat. Nos. 4,188,166; 2,861,701; and 3,817,403.

U.S. Pat. Nos. 4,360,886, and 4,367,532 show devices for providing a program sequence of motions with a robot, and include controller systems for controlling the mechanical construction of the robot.

In addition, another type of manipulator hand is shown in U.S. Pat. No. 3,247,978, but which has its drive motors up near the end of the arm. The hand is driven through various gear drives. This hand, however, does show the use of electromagnetic clutches, which also form part of the present device. The grip operating motor is located down near the hand in this device.

Another type of arm used in manipulators for handling workpieces is shown in U.S. Pat. No. 4,064,656.

An industrial robot utilizing complex gear and shaft drives for obtaining the required motion is further described in U.S. Pat. No. 3,985,238.

None of these, however, have very simple drives for providing a plurality of joint motions in a wrist, shoulder or elbow assembly with gear drives and selectively operable brakes for controlling motions about a plurality of axes for a robot arm and wrist using a minimum number of motors and very simple controls.

SUMMARY OF THE INVENTION

The present invention relates to industrial robots, and more particularly to robot controls utilizing brakes and gear drives that reduce the number of motors that are necessary for operating the robot about its operational axes.

In particular, as illustrated, a robot arm is mounted on a base and has a shoulder joint supporting an upper arm and a forearm connected to the upper arm at an "elbow" joint. A wrist is connected to the forearm. The wrist is operable about three independent axes. The upper arm is connected to the base at the shoulder through an axis parallel to the "elbow" axis, and is also connected to the base about a vertical axis. The upper arm can be rotated about an axis mutually perpendicular to the elbow and shoulder axes to provide seven axes of operation for the robot.

In the form shown, only two motors are necessary, and in particular the operation of the movable joints is through a unique arrangement to provide a compact, easily operated assembly that can easily be controlled through the use of drive motors and clutches that in turn control the operation about the various axes.

DETAILED DESCRIPTION OF THE PREFERRED EMBODIMENT

An industrial robot illustrated generally at 10 made according to the present invention includes a support base 11 that is mounted onto a support floor 12, or on an overhead bridge, a trolley or the like which comprises the main support. The base 11 has a support sleeve 13 fixed to the top wall of the base. The axis of sleeve or housing 13 is vertical as shown and mounts a motor which is shown schematically at 20 in FIG. 1. The motor 20 is mounted on the base and powered through suitable controls.

Figure 1:
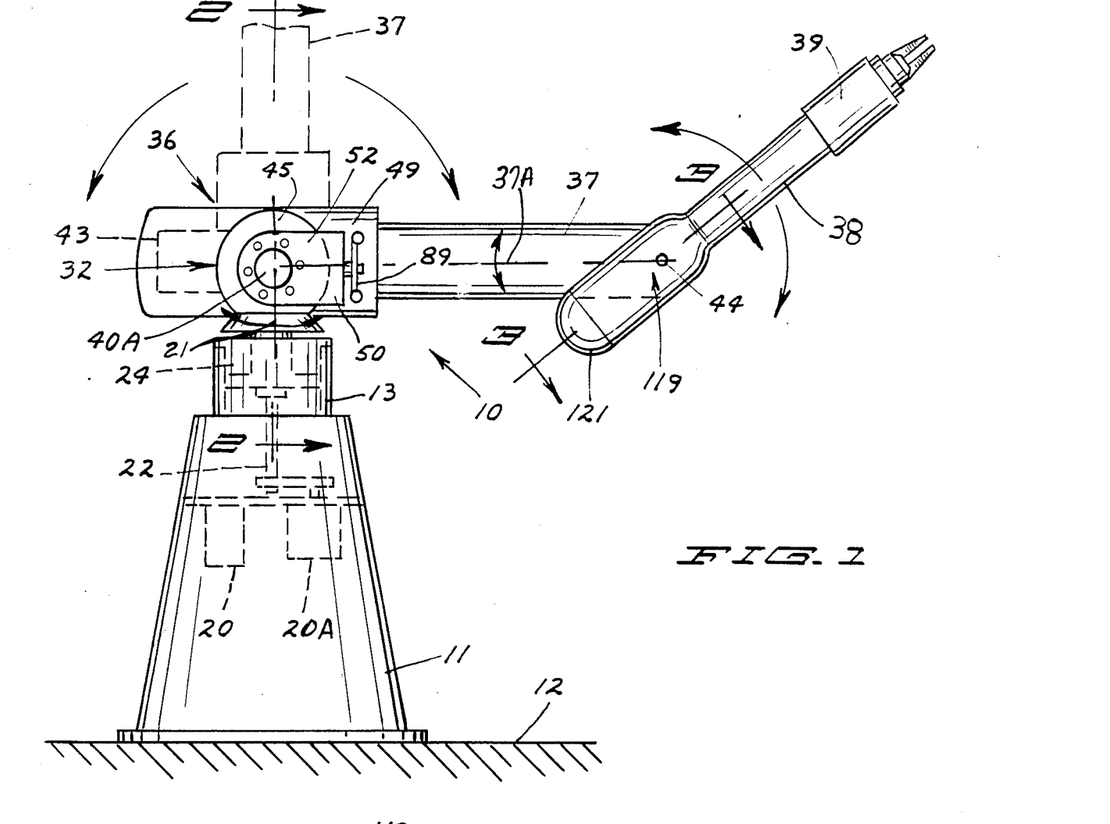
FIG. 1 is a side elevational view of a robot made according to the present invention.

The motor 20 has an output shaft that drives through a suitable speed reducing drive 20A to drive an elongated coupling 22 coupled to a drive shaft 23 having an axis 21 called a neck axis which is rotatably mounted through a center bore of the hub 30 of an electric brake 24 having a housing 25 fixedly mounted on the interior of the sleeve 13 and rotably mounted on hub 30 through a large bearing 29. The hub 30 has a flange 30A that carries a brake armature 30B through an annular, flat spring 30C. The spring 30C is a ring fastened at three annularly spaced locations to the flange 30A and to the armature 30B at three different annular locations so the armature will rotate with the flange 30A but can move axially toward housing 25 under spring load. The spring acts as an axially flexible, rotationally driving member. The structure is a conventional flexible coupling and the coupling springs used for driving the armatures of each brake assembly herein are supplied with the brakes when purchased from a supplier.

The housing 25 houses a coil 25A, which, when energized, magnetically locks the housing 25 and armature together to prevent rotation of hub 30 relative to the brake housing 25. The armature is magnetically clamped against a matching steel plate.

The hub 30 has a gear housing 32 fixed thereto on the end opposite from flange 30A. The shaft 23 passes into the interior of the gear housing 32 and has a gear 65 driveably mounted thereon, as will be explained.

A thrust bearing 26 is positioned between the end of the brake housing 25 and a drive sprocket 27 which is drivably mounted on shaft 23. Sprocket 27 comprises a typical rotating encoder drive means to provide signals indicating position of the shaft 23. A nut 28 threads onto the shaft 23 to permit adjustment. The hub 30 and the gear housing 32 are prevented from rotating relative to the sleeve 23 when the brake 24 is energized. The brake housing 25 is fixed to the sleeve 13 with a flange 25B that fastens to the end of the sleeve.

The brake assembly shown at 24 is a conventional commercially available unit. The KEB-E brake, Model 02.320 made by Karl E. Brinkmann GmbH, Forsterweg, West Germany, is satisfactory. Other types of brakes or locks may be used as well.

At the top of the sleeve 13 a main shoulder pivot assembly illustrated generally at 36 is rotatably supported on the hub 30 and through the bearing of the brake assembly to sleeve 13. The shoulder assembly 36 is used for supporting and driving an upper arm tube 37 about the axis 40A of a generally horizontal pivot shaft 40 that is perpendicular to the axis 21. Upper arm 37 is a tube which has a support assembly at its lower (outer) end for supporting a forearm assembly 38, with a wrist assembly 39 at the outer end of the forearm.

The shoulder assembly 36 includes drive gearing for controlling rotation of the upper arm tube 37 about its longitudinal axis 37A, which is perpendicular to the axis 40A and for driving the gear housing 32 about the neck and axis 21. The vertical axis 21 or neck axis and axis 40A are perpendicular to each other and intersect to form a reference plane. The axis of upper arm tube 37 and the axis 40A also intersect.

A drive motor 43 is mounted on a support which moves about axis 40A with the upper arm tube 37. Motor 43 provides power to drive the forearm assembly 38 about the elbow pivot axis indicated generally at 44 as well as powering the motions of the wrist assembly. The elbow pivot axis is perpendicular to the longitudinal axis of the upper arm tube 37 and parallel to the axis 40A.

The gear housing 32 includes a pair of parallel plates 45 and 46 which are fixed to a base wall 47 of the gear housing 32. Base wall 47 is securely mounted on hub 30. The wall 47 and the gear housing 32 are free to rotate about the neck axis 21 when the brake 24 is released. The base wall 47 supports the gear housing 32 for rotation about neck axis 21. Shaft 40 is mounted on and extends between the plates 45 and 46 and does not rotate relative to the plates 45 and 46.

Figure 2:
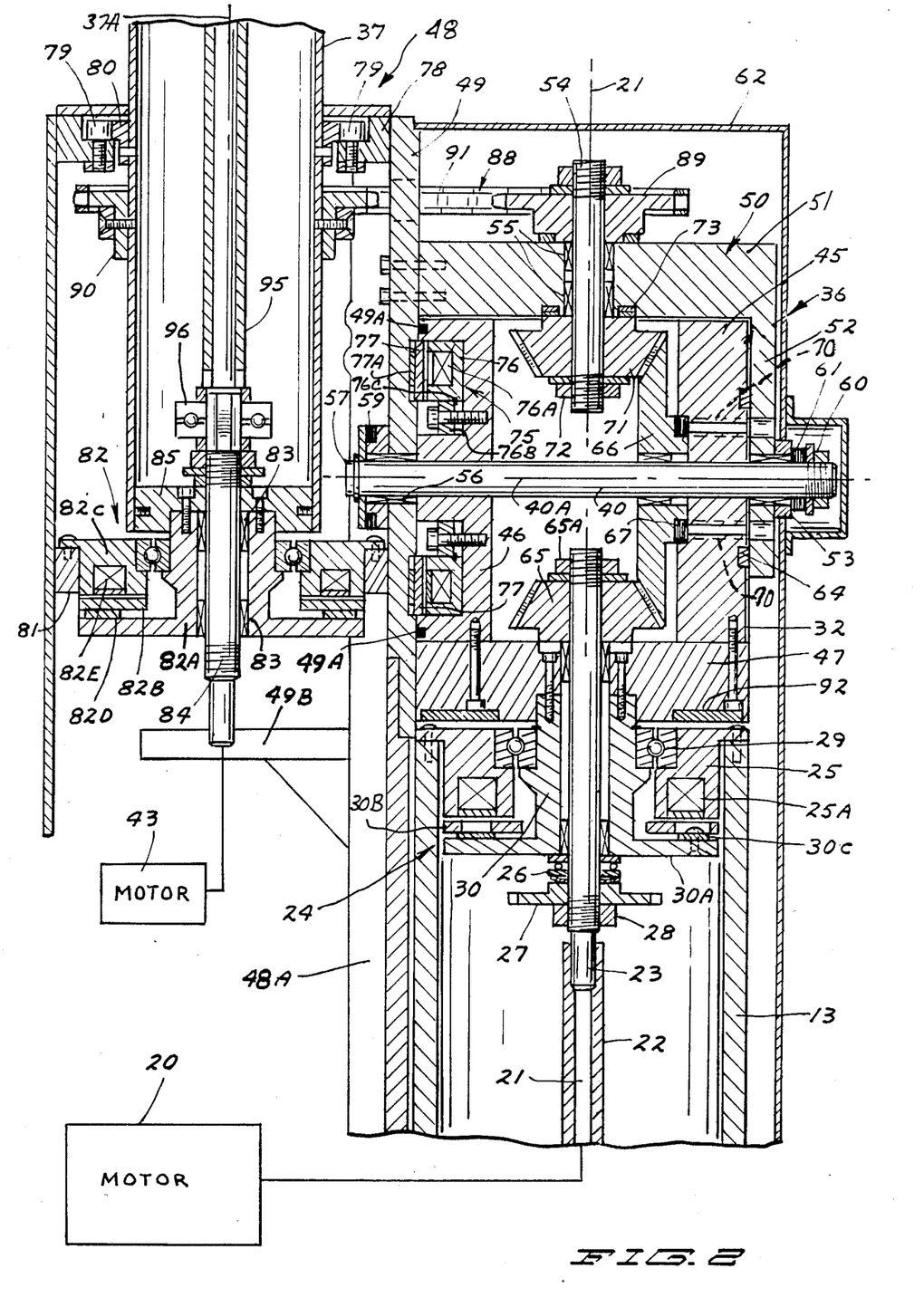
FIG. 2 is a fragmentary vertical sectional view taken generally along the section line 2—2 in FIG. 1 with the upper arm in its dotted line position.

The upper arm tube 37 is carried on a support assembly 48, which includes a main mounting plate 49 that is positioned along one side of the gear housing 32, and specifically adjacent to the outer side of the plate 46. An annular thrust bearing 49A spaces plate 49 and plate 46. The plate 49 is connected to an L shaped yoke 50 that has a yoke base 51, and a support leg 52. The support leg 52 has a suitable bushing 53 and bushing 53 is mounted onto an outer end of the shaft 40, as can be seen in FIG. 2. The yoke base 51, which is at right angles to the support leg 52, spans across the ends of the plates 45 and 46. The plates 45 and 46 have rounded end surfaces, so that the yoke 50 can rotate around the axis 40A of the shaft 40.

A shaft 54 is rotatably mounted in suitable bearings 55 in the yoke base 51, and the shaft 54 has an axis that lies along the axis 21 when the yoke is in its position as shown in FIG. 2, and the axis of shaft 54 is coplanar with the axis 21 and the axis of shaft 54 intersects the axis 40A at the same point as where axis 21 intersects axis 40A. As the shaft 54 is moved with the yoke 50 around the axis 40A of the shaft 40 it moves in a plane with the axis 21. The plate 49 also will rotate about the axis of the shaft 40, and is mounted on the shaft with a suitable bushing 56. The shaft 40 has a retaining ring 57 at the end adjacent the bearing 56, and this retains a thrust bearing assembly 59 to hold the plate 49 on the shaft 40, and permits the plate 49 to rotate relative to the shaft 40.

At the other end of the shaft 40 there is an adjustment nut 60 threaded onto the end of the shaft and bearing against a suitable thrust bearing assembly 61 to provide for adjustment and for retaining the yoke 50 in position on the shaft, and also holding the support assembly 48 on the shaft.

It should be noted that the yoke base 51 is fixed to the plate 49 with suitable cap screws, and the plate 49 will rotate relative to an outer housing or cover 62 (removed in FIG. 1) that is positioned around the sleeve 13, the gear housing 32, and yoke 50. The shafts and bearings can be sealed in a suitable manner if desired. A thrust bearing 64 may be provided between the leg 52 of the yoke 50 and the plate 45.

Plate 47, which is the base of the gear housing 32, is mounted on the hub 30, and is fixed from rotation relative to the hub 30. The input shaft 23 is also rotatable relative to plate 47 on suitable bearings, and the end of the input shaft 23 on the interior of the plate 47 has the bevel pinion gear 65 drivably mounted thereon, and held in place with a suitable nut 65A. The bevel gear 65 drives a bevel gear 66 that in turn is rotatably mounted on the shaft 40. Bevel gear 66 is mounted with suitable bushings on the shaft 40, and a thrust bearing 67 is mounted between the base or hub of the gear 66 and the inner surface of the plate 45. For adjustment purposes, there are a plurality of threaded openings 70 into which set screws can be adjustably threaded to bear against the thrust bearing 67 and provide for gear backlash adjustment. There are access openings in the yoke leg 52 so that set screws in threaded opening ,70 can be accessed for adjustment.

The shaft 54 has a bevel gear 71 drivably mounted thereon, and a nut 72 is used for adjusting this gear. Likewise, a suitable thrust bearing 73 is used between the back side of the hub of gear 71 and the inner surface of the yoke base 51.

A second electric brake assembly 75 is mounted in a recess on the outer surface of the plate 46 forming part of the gear housing 32, and this brake 75 has a housing 76 fixed to the plate 46 with an annular metal ring 76B bearing against a snap ring 76C in a bore in housing 76. The ring 76B is held with cap screws which thread into the gear housing plate 46. The housing 76 may also be pinned to plate 46 to prevent rotation. An armature 77 is coaxially mounted with the housing 76. The armature 77 is coupled to the mounting plate 49 for the support assembly 48 with an annular spring 77A forming a flexible coupling so the armature and plate 49 will be in annular driving relationship to each other, but the armature can move axially relative to plate 49. When the brake 75 is energized in a conventional manner, a coil 76A in housing 76 will form a magnetic field to clamp the armature 77 tightly to the housing 76 and prevent rotation of the plate 49 relative to the housing 76 and gear housing 32 and therefore relative to shaft 40. A KEB brake model 02.130 made by Karl E. Brinkmann, GmbH of Forsterweg, West Germany, is satisfactory for use.

The shaft 40 provides support for the entire arm assembly including the upper arm tube 37, and the rest of the components attached to it.

The plate 49 has a motor mounting plate 48A attached thereto and extending alongside the sleeve 13, and this is for mounting the motor 43, and includes a support 49B as shown. Additionally, the arm support has an annular hub 78 adjacent to the end of the plate 49, and extending at right angles thereto. The hub 78 has a central opening for supporting the upper arm tube 37, as shown, and a plurality of rollers 79 are mounted in provided pockets on the hub 78, and these rollers in turn then roll against a inner bearing race 80 that surrounds and is fixed to the upper arm tube 37 with suitable screws. The race 80 will rotate on the rollers 79, which comprise a bearing support, that gives adequate support for permitting the tube to rotate. A large circular roller bearing could also be used.

At the inner or back end of the upper arm tube 37, a support ring 81 is fixed to the plate 49. The ring 81 supports an electromagnetic brake assembly 82 which includes a hub 82A, a housing 82C and an armature 82B mounted with an annular spring member 82D to a radial flange formed on hub 82A. The armature rotates with the hub 82A but can move axially a short distance. When the brake 82 is energized, a coil 82E acts to clamp the armature to the housing 82C and the hub 82A will be held from rotation relative to housing 82C.

Bearings 83 are provided on the interior of the hub 82A for rotatably mounting a shaft 84 which extends through a bore in the hub 82A. An end closure plate 85 is positioned on the interior of the upper arm tube 37 forming the upper arm and is fixed to the tube 37. This end plate 85 is also fixed to the end of hub 82A, and thus the end of the upper arm tube 37 is supported on the hub 82A and through a large bearing to the brake housing 82C. The upper arm tube is thus supported for rotation relative to the ring 81 and the plate 49.

When the brake 82 is energized the upper arm tube 37 is prevented from rotation about its axis, but when the brake 82 is deenergized, the upper arm tube 37 can rotate on the rollers 79 and on the bearing forming part of the brake assembly 82. The brake 82 is the same construction as brake 24.

It can thus be seen that rotation of the support assembly 48 and the upper arm tube 37 about the shoulder pivot axis 40A, which is the axis of the shaft 40, will depend upon the condition of the brake 75, which, when energized, will prevent such rotation. The ability to rotate the upper arm tube 37 about its longitudinal axis will depend upon the state of the brake assembly 82. When the brake 82 is energized the upper arm tube 37 cannot rotate about its axis.

The upper arm tube 37 may be driven rotationally about its axis while supported on the rollers 79 and the hub 82A through the use of a chain and sprocket drive assembly 88. This includes a sprocket 89 which is drivably mounted onto the shaft 54, which is on the yoke base plate 51. Suitable thrust bearings can be used behind the sprocket 89. A sprocket 90 is drivably mounted onto the upper arm tube 37 between the plate 78 and the brake 82. This sprocket 90 has a large center bore so that it slips over the upper arm tube 37 and it is fixed with respect to the upper arm tube 37. Then, a chain 91 drives between these two sprockets, through provided openings in the plate 49 (shown in dotted lines) so that when the shaft 54 is driven and brake 82 is released, the upper arm tube 37 can be rotated, which will in turn also rotate the forearm 38 and wrist 39.

Thus, in summary, brake 24, when energized, will prevent rotation of the hub 30 and plate 47 and thus the gear housing 32 relative to the main support sleeve 13, and when released will permit such rotation; when brake 75 is energized it will prevent rotation of the plate 49, and thus the housing 48 which supports the upper arm, about the axis 40A of shaft 40, and when released will permit such rotation; and brake 82, when energized, will prevent rotation of the upper arm tube 37 about its longitudinal axis, and when released will permit such rotation.

A suitable slip ring indicated generally at 92 is provided on the underside of the plate 47 of the gear housing 32, to carry control signals for the various brake members, including those which are provided in the arm assembly. The slip ring 92 of course will have suitable contacts acting against it, which contacts will be mounted on the sleeve 13 in a conventional manner.

The shaft 84, which is driven from the motor 43 has its inner end, on the interior of the upper arm tube 37, drivably coupled to a drive shaft 95. A suitable coupling shown at 96 can be used for making this drive connection, and it is made so that it is adjustable and will telescope in longitudinal length if there is a slight shift in position. The drive coupling can be any conventional design, so that whenever the motor 43 is powered the shaft 95 will rotate. It can be seen that the tube 37 can be rotated independently of the shaft 95, and that the shaft 95 does not power any components in the shoulder assembly. Shaft 84 is hollow, so that suitable air lines can be provided through the center of the shaft and through the center of the drive shaft 95, which is tubular to other parts of the robot arm assembly.

The motor 20 provides for control of motion of the complete arm assembly about the axis 21 and drives through the gears 65, 66 and 71 as controlled by the brakes 24 and 75. The motor 20 drives bevel gear 65, which in turn drives the ring gear 66 that is rotatably mounted onto shaft 40 and which gear meshes with gear 71.

Encoders are utilized for determining the rotational position of the shaft 23, as well as the rotational position of assembly 48 about shaft 40 and the rotational position of shaft 84. The amount of rotation of the upper arm tube 37 also can be determined by sensing the rotation of shaft 23 through resolver drive sprocket 27 by simultaneously sensing which electric brake or brakes are energized.

When the magnetic brake 82 is energized it will hold the hub 82A from rotation relative to ring 81 and prevent rotation of the upper arm tube 37. When this rotation is prevented, and the electromagnetic brake 75 is released with brake 24 energized, the shaft 54 and gear 71 can rotate relative to the gear housing 32, and the gear 65 will cause the gear 66 to rotate and this will drive the plates 46 and 47, and all the connected parts, including the arm 37 and connected parts about the axis 40A for forming the shoulder pivot or rotation of the arm.

When the tube 37 is to be rotated, brake 82 is released, so that the tube 37 and hub 82B can rotate and the brakes 24 and 75 are also energized. Then the gear 66 will be rotated by the drive gear 65, which in turn will rotate the gear 71, driving the shaft 54 and sprockets 89 and 90, thereby rotating the upper arm tube 37 about its axis.

When both brakes 75 and 82 are energized and brake 24 is released, driving the motor 20 will cause the entire arm assembly to rotate about the vertical axis 21 because as gear 65 is rotated, gears 71 and 66 are prevented from rotating. The gear housing 32 will be driven around the axis of gear 65.

Table I is a summary of action occurring when the operable combinations are in effect.

TABLE I

| Brakes | 24 | 75 | 82 | Result when motor 20 is powered |
|---|---|---|---|---|
|  | X | O | X | Arm rotates about 40A |
|  | O | X | X | Arm rotates about 21 |
|  | X | X | O | Rotates 37 about its axis |

X = locked
O = Open

ELBOW ASSEMBLY

Figure 3:
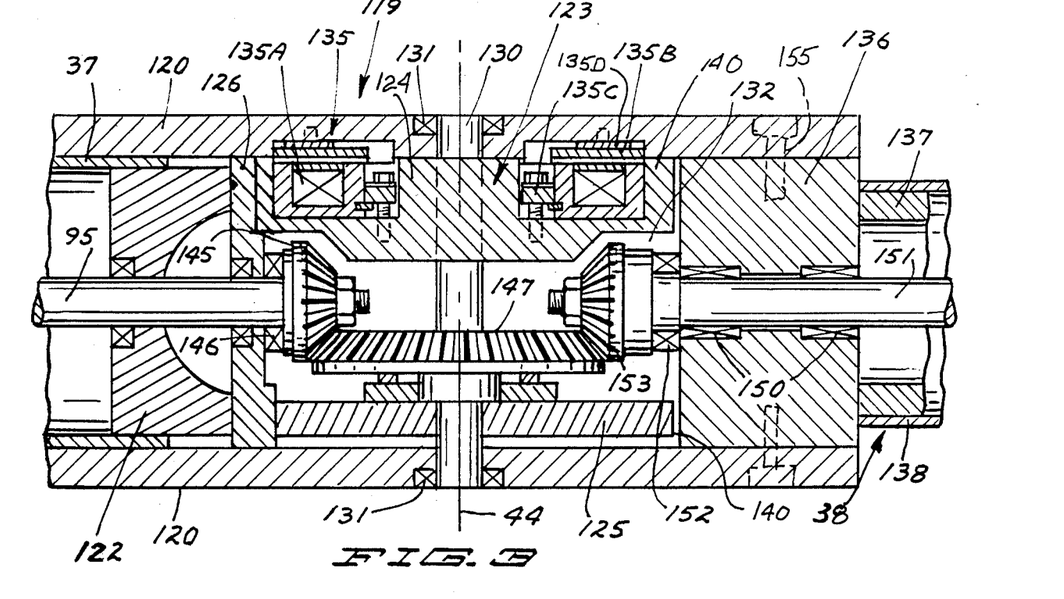
FIG. 3 is a sectional view taken generally along line 3—3 in FIG. 1 with parts in section and parts broken away.

The elbow assembly controlled at elbow axis is driven operated from the motor 43 and operated by the shaft 95, and is shown in FIGS. 1 and 3.

The elbow assembly 119 has a pair of side plates 120,120 which carry counterweights 121 at the outer ends of the plates. The side plates are used for supporting the forearm assembly 38 in a suitable holding bracket, and as can be seen in FIG. 3, the lower or outer end of the upper arm tube 37 has a block 122 therein which is fixed to a housing 123. The housing 123 has a first side plate 124, and a second side plate 125 which are fixed to a base 126 of the housing. The walls 124 and 125 mount the elbow axis shaft 130. The mounting plates 120 are mounted in suitable bearings at 131 on the shaft 130.

The plates 124 and 125 of the housing 123 are spaced apart at the outer end portion shown at to provide for pivotal movement of the forearm 38 relative to the housing.

The wall 124 is made to mount an electromagnetic brake 135, with the brake housing 135A attached to the wall plate 124 in a provided recess. Cap screws pass through openings in a collar 135C and are threaded into wall 124 and bears against a snap ring in the housing 135A to hold the housing 135A clamped in position. The housing 135A is also pinned to the wall 124 to prevent rotation. A brake armature 135B is drivably mounted in a suitable recess in the one side plate 120 through an annular flexible coupling spring 135D that permits axial movement, so that when the magnetic brake assembly is energized, the brake holds that side plate 120 from rotation relative to the housing 123. When the brake 135 is released, the side plates 120 can rotate relative to housing 123 about elbow axis 44, which is the axis of shaft 130.

The lower or outer ends of the side plates 120 are bolted to a mounting block 136 that has an annular hub 137 fixed thereto on which a tube 138 is fixedly mounted. The tube 138 is the tube forming the forearm 38.

The block 136 is spaced from the outer ends 140 of the housing walls 124 and 125, so that the side plates 120 are able to move about the elbow axis 44, which is the axis of the shaft 130. As the block 136 moves around the axis 44 the tube 138 will also move about this axis.

An input bevel drive gear 145 is drivably mounted on the shaft 95. A thrust bearing 146 is used between gear 145 and wall 126. The shaft 130 has a bevel gear 147 rotatably mounted thereon. Gear 147 engages the gear 145. The shaft 95 is tubular, so that air conduits can be passed through the shaft 95. The base wall 126 of housing 123 and the mounting block 122 have bearings for supporting the shaft 95.

Block 136 has suitable bearings or bushings 150 therein which in turn rotatably mount a shaft 151, which has an end positioned between the side wall plates 124 and 125 of the housing 123. A suitable thrust bearing 152 is mounted over the shaft to back up and position a bevel gear 153 that is drivably mounted onto the shaft 151 and engages the bevel gear 145. The thrust bearing 152 reacts thrust loads from the bevel gear 153 onto the block 136. Because the block 136 is held with the side plates 120 through the use of suitable bolts such as that shown at 155, and the shaft 130 holds the side plates 120 in place, the gear 153 will be driven by bevel gear 147 whenever the bevel gear is rotating, and the shaft 151 is free to rotate.

The brake 135 when energized will hold the forearm assembly 38 from pivoting, and thus hold the side plates 120 in a fixed rotational position. Holding shaft 151 from rotation (with brakes in wrist assembly 39) while releasing the brake 135 so that plates 120 can rotate, will permit changing the angular position of the forearm assembly about the elbow axis 44.

The shaft 151 does not have to be hollow, because air lines and the like can come out from the shaft 95 in the elbow assembly and then pass through provided openings in the block 136 into the interior of the tube 138, and then carried on down to the wrist assembly 39.

WRIST ASSEMBLY

Figure 4:
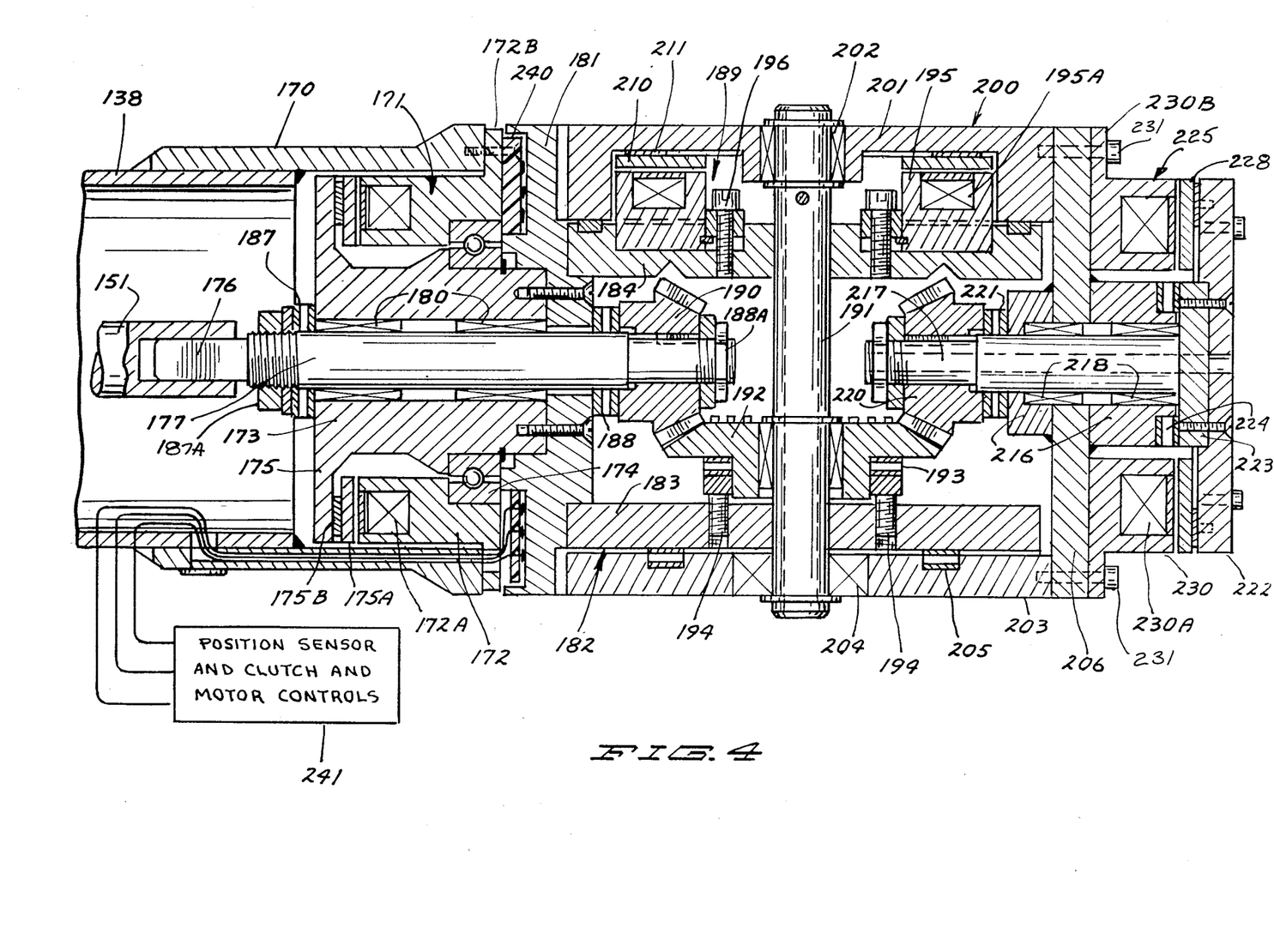
FIG. 4 is a sectional view of the wrist assembly made according to the present invention taken with parts removed for sake of clarity with parts in section and parts broken away.

The wrist assembly 39 is shown in FIG. 4 in detail, and it can be seen that the forearm tube 138 is fixed to an outer sleeve housing 170, and housing 170 in turn has an electromagnetic brake 171 mounted at the interior end thereof and fixed relative thereto. This is a conventional electromagnetic brake similar to brake 24 having an annular coil housing 172 for housing the energization coil 172A. Housing 172 is held in place on the housing 170 with a flange 172B attached to the end surface of sleeve housing 170, and a hub 173 of the brake 171 is mounted through a suitable bearing 174 relative to the housing 171. The hub 173 has an annular flange plate 175, which, when the brake is energized, will be held relative to the housing 171 through an armature ring 175A which is attached to the flange 175 through an annular spring 175B that provides a rotational drive between the flange 175 and the armature 175A but permits the armature 175A to move axially to be magnetically held on the housing 172 when coil 172A is energized and thus lock the brake.

When the brake 171 is not energized the hub 173 will be free to rotate on the bearing 174 relative to housing 172.

The shaft 151, which extends through the interior of the tube 138, has a drive coupling end indicated generally at 176 thereon which in turn drives a first or input wrist drive shaft 177. Drive shaft 177 is rotatably mounted on the interior hub 173 of the brake 171 on suitable bearings 180.

A mounting flange 181 is drivably mounted on the inner end of brake hub 173. The drive shaft 177 passes through an opening in flange 181. The flange 181 forms a base for a gear housing 182 that includes a pair of generally parallel plates 183 and 184 mounted on the flange 181 to form a space therebetween. Housing 182 is the wrist drive and support housing and on the interior of the housing there is a drive bevel gear 190 drivably mounted onto the shaft 177.

A thrust bearing 187 is used between a nut 187A on shaft 177 and flange 175 and thrust bearing 188 is between gear 190 and plate 181. A nut 188A holds the gear 190 on shaft 177 and permits adjustment of the bearing loads. The plates 183 and 184 in turn retain a cross shaft 191 that is at right angles to the axis of the shaft 177, and is nonrotatably mounted in the plates 183 and 184. Shaft 191 has a bevel gear 192 rotatably mounted thereon, which meshes with the gear 190 as shown to form a right angle drive. Bevel gear 192 is backed with a thrust bearing 193 which is backed up on the backside of the gear 192 through the use of adjustable set screws 194 threadably mounted in the plate 193. On the opposite plate 184, a coil housing portion 195 of an electromagnetic brake assembly 189 is mounted in place on the plate 184 through the use of cap screws 196 acting through a collar and threaded into plate 184 to bear against a snap ring. The brake 189 is the same construction as brakes 135 and 75.

The shaft 191 has a wrist joint yoke 200 rotatably mounted thereon. This wrist joint yoke 200 includes a side plate 201 rotatably mounted on one end of the shaft 191 through the use of a bearing 202, and a plate 203 that is rotatably mounted on the opposite end of the shaft 191 through the use of a bearing 204. Plate 203 is held spaced from the plate 183, and parallel thereto, and a suitable thrust bearing 205 can be utilized in wall 203 for taking any thrust loads. The plates 201 and 203 are supported on a base plate 206 shown at the right end in FIG. 4.

A brake armature ring 210 of the electromagnetic brake member 189 is mounted with an axially movable, rotationally driving, flexible coupling spring ring 211 to the plate 201. When the coil 195A of brake 189 is energized, the plate 201 is held from rotation through the brake armature 210 which is clamped against the housing 195 under magnetic force. The plate 201 is also held from rotation about the shaft 191. Brake 189 and brake 171 will provide for control of movement of the wrist as will be explained.

The end or base plate 206 of wrist joint assembly 200 has hub section 216 fixed thereon which extend outwardly from the plate and which rotatably mount a shaft 217 in suitable bearings 218. The shaft 217 has a bevel gear 220 drivably mounted thereon and positioned between plates 183 and 184. A suitable thrust bearing 221 is used to back the gear 220. The gear 220 drivably engages the gear 192.

The opposite end of the shaft 217 extends outwardly from the hub portion 216, and has a flange 223 drivably mounted to its end surface. A brake plate 222 is in turn mounted on the flange 223. The plate 223 carries the armature 228 of an electromagnetic brake 225. The armature 228 is driveably coupled to plate 222 through an annular flexible coupling spring 229 which permits axial movement of the armature but which drives rotationally. A brake housing 230 is fixed to the plate 206 with suitable cap screws 231. A thrust bearing 224 is provided between plate 223 and the outer hub portion 216. When coil 230A of brake 225 is energized the plate 222 will be held from rotation because the armature 228 will be pulled against the housing portion 230 by magnetic force and held clamped together. Brake 225 is the same as brake 189 except the housing has a mounting flange 230B for attaching the housing to the plate 206.

A suitable slip ring assembly illustrated generally at 240 near the plate 181 is provided carrying electrical connections that are necessary for operation of the electromagnetic coils that are in the brake portions 195 and 230, so the control for such brakes is back at a central controller.

A suitable tool or grip can be mounted onto the plate 222, and perform the functions necessary for robots. These grips can be conventional, and include automatic tools or the like.

When the brakes 171, 189 and 225 are energized, the shaft 151 will be held from rotation, and this will provide the braking action necessary so that when the input shaft 95 is rotated, and the brake 135 (in the elbow, see FIG. 3) is released, the forearm assembly 38, including the wrist assembly 39 will be forced to rotate, through the driving of gear 145 and 147, about the axis 44 of shaft 130 in the elbow.

When the elbow brake 135 is energized, and shaft 95 is rotating, with the brake members 171 and 189 energized and the brake member 225 deenergized, the shaft 151 will be driven by rotation of the gear 145, 147 and gear 153. This in turn will drive the shaft 177, gear 190, gear 192 and gear 220 to rotate the shaft 217 and rotate the tool held on the plate 222.

If the brake members 171 and 225 are energized, and the brake member 189 deenergized, with the brake 135 energized to hold the plates 120 in position, gear 190 again will be driven as shown, and this will rotate the gear 192, but because gear 220 is held from rotation by brake 225, the gear 192 will rotate and drive the gear 220 and the robot wrist yoke 200 about the axis shaft 191 and control movement about this axis.

With the brake member 171 deenergized, and the three brake members 135, 189 and 225 energized, rotation of the shaft 151 will cause the driving of gear 192 about the axis of the shaft 177, because there cannot be any other movement in the wrist and this will give full rotation of the wrist. Again, the slip rings 240 will accommodate this movement and still carry power to the brakes and also position signals from the movable parts.

The axes of movement of the wrist all intersect at a common point on the axis of shaft 191 so the actions are easily controlled. The gear drive and brakes operate reliably with a minimum of power sources.

Although the present invention has been described with reference to preferred embodiments, workers skilled in the art will recognize that changes may be made in form and detail without departing from the spirit and scope of the invention.

What is claimed is:

1. A robot joint for operating about a plurality of axes comprising a support;
   a single drive shaft, said drive shaft being mounted on said support for rotation about a first axis;
   a single motor for driving said first shaft;
   a gear housing rotatably mounted relative to said shaft and said support and including a cross shaft perpendicular to the first mentioned drive shaft;
   a yoke mounted on said cross shaft and rotatable relative thereto;
   a third shaft rotatably mounted on said yoke generally perpendicular to said second shaft, and having an axis lying in a plane with the axis of said first shaft perpendicular to the axis of the second shaft;

first and second bevel gears drivably mounted on said first shaft and on said third shaft;

a coupling gear on said second shaft for drivably connecting said first and second bevel gears;

first brake means having first and second portions coupled to the gear housing and first shaft, and including means operable for selectively permitting rotation of said gear housing about said first shaft relative to the support;

second brake means having first and second portions connected to the yoke and second shaft, respectively, and including means operable to selectively permit rotation of said yoke about said second shaft; and third brake means having first and second portions connected between the yoke and said third shaft and having means operable to selectively permit rotation of said third shaft relative to the yoke, whereby when said first shaft is driven, the first, second and third brake means can be selectively operated to obtain selective rotation of the gear housing about the axis of said first shaft, rotation of the yoke about the axis of said second shaft, and rotation of said third shaft sbout its own axis at any selected position of the yoke about the axis of the second shaft.

2. The apparatus as specified in claim 1 wherein said brake means comprise electromechanical brakes, each of said electromechanical brakes having first and second portions and being respectively operably connected to be concentric with the respective first, second and third shafts.

3. The apparatus as specified in claim 2 and slip ring means to carry power to the electromechanical brakes mounted relative to said second and third shafts, said slip ring means being operable between said support and said gear housing.

4. The apparatus as specified in claim 1 wherein said support comprises a forearm member of a robot arm assembly, and the robot joint comprises a robot wrist, said robot arm assembly further having an upper arm member, said forearm member and upper arm member being pivotally mounted together about an elbow axis perpendicular to the axis of the first shaft, gear drive means at the axis of mounting said forearm and upper arm to each other, said gear drive means comprising an idler bevel gear concentric with the axis of pivot between the forearm and upper arm, and third and fourth bevel gears, respectively, one of the third and fourth bevel gears being drivably mounted on said upper arm adjacent the elbow axis, and the other having an axis parallel to the axis of the bevel gear on the upper arm and drivably mounted to drive said first shaft through said forearm.

5. The apparatus as specified in claim 4 and fourth electromechanical brake means for selectively permitting or stopping rotation about the pivot axis between the forearm and upper arm.

6. The apparatus as specified in claim 5 and a shoulder assembly mounting said upper arm, motor means mounted on said shoulder assembly for movement with said upper arm, said motor means driving the one bevel gear mounted on the upper arm adjacent the elbow axis to provide power through the pivot connection between the upper arm and forearm to said first drive shaft.

7. The apparatus as specified in claim 6 wherein said shoulder assembly comprises means to rotatably mount said upper arm about its longitudinal axis comprising the axis of rotation of said one bevel gear adjacent the elbow axis, and power means to selectively drivably rotate said upper arm, wherein said means to mount said upper arm comprises an upper arm support pivotally mounted about a shoulder axis perpendicular to the longitudinal axis of said upper arm, and including a second gear housing having a second cross shaft, a second yoke mounted on said second cross shaft, the second yoke supporting the upper arm and the axis of said second cross shaft comprising the shoulder axis, and means to control pivotal movement of said second yoke about the axis of said second cross shaft.

8. The apparatus as specified in claim 7 wherein said second yoke is mounted onto the second gear housing, said second gear housing having a second base, a main support, said second base being selectively rotatably mounted about an axis perpendicular to the axis of said second cross shaft with respect to the main support housing, a third drive shaft rotatably mounted on said main support housing and rotatably mounted with respect to said second base of said second gear housing, the third drive shaft having an axis intersecting the axis of the second cross shaft; an input bevel gear drivably mounted on said third drive shaft on the interior of said second gear housing, a second idler gear rotatably mounted with respect to said second cross shaft, a second yoke output shaft rotatably mounted with respect to the second yoke and having an axis intersecting the axis of said second cross shaft at a point coincidental with the point of intersection of the axis of said third drive shaft and said cross shaft, an output bevel gear mounted on said second yoke output shaft and drivably engaging said second idler gear, said means to rotate said upper arm comprising a sprocket drivably mounted on said second yoke output shaft, and a sprocket mounted on said upper arm, said second yoke output shaft and the axis of said upper arm being substantially parallel and fifth, sixth and seventh electromechanical brake means mounted respectively to control rotation of said second gear housing, said second yoke with respect to said gear housing, and rotation of said upper arm with respect to the upper arm support, whereby selective energization of said fifth, sixth and seventh electromechanical brake means will permit movement of said second gear housing about the axis of said third drive shaft, rotation of said upper arm by said third drive shaft, said idler gear and said second yoke output shaft, and selective rotation of the upper arm about the axis of the second cross shaft through movement of said second yoke when said third drive shaft is powered.

9. The apparatus as specified in claim 8 and a second drive motor to drive the third drive shaft, whereby motions about seven separate axes with respect to said main support are controlled through the use of the first and second motors.

10. A robot assembly controlled about seven separate axes of movement, and powered about such axes through the use of two power sources and selectively operable separate brake means comprising:

a main support base;

a first gear housing rotatably mounted on said main support base about a first axis, including a first drive shaft mounted on said first axis for rotation relative to said main support base and said first gear housing, said first gear housing including means to mount a first cross shaft on said gear housing, said first cross shaft having a second axis generally perpendicular to the first drive shaft and said first axis, a first bevel drive gear drivably mounted on said first drive shaft, a first bevel idler gear mounted on said first cross shaft for rotation relative to the first cross shaft when driven by the first drive gear;

a first support yoke rotatably mounted relative to and on said first cross shaft, said first support yoke having a wall portion, a first output driven shaft rotatably mounted on said first yoke wall portion and having an axis perpendicular to the axis of the first cross shaft and intersecting said first cross shaft axis at the same point as the intersection of the first drive shaft and the first cross shaft axes;

a first elongated member mounted on said first yoke, said elongaged member being rotatable about its longitudinal axis, said longitudinal axis being generally parallel to the plane defined by the axes of the first drive shaft and the first output shaft and perpendicular to the first cross shaft;

drive means to rotationally drive said first elongated member about its longitudinal axis from said first output shaft when the first output shaft is rotated;

first brake means to selectively control rotation of the first gear housing about the first axis relative to the main support base;

second brake means to selectively control rotation of said first yoke about the axis of said first cross shaft;

third brake means to selectively control rotation of said elongaged member about its longitudinal axis relative to the yoke;

said first elongated member comprising a first tube, a second drive shaft rotatably mounted on the interior of said first tube and extending out through the end of said tube adjacent said main support base;

a second elongated member;

means to pivotally mount the second elongated member to the outer end of said first elongated member about a third axis generally parallel to the second axis, the means to pivotally mount said second elongated member comprising a second gear housing fixedly mounted on the end of said first elongated member, said second gear housing including a second hear housing bevel gear drivably coupled to said second drive shaft, a second cross shaft having an axis coincidental with said second axis, a second idler bevel gear rotatably mounted on said second cross shaft, and a second yoke pivotally mounted on said second cross shaft for movement about said second axis, said second elongated member being mounted directly to said second yoke for movement therewith, and a second output bevel gear mounted on said second yoke and engaging said second idler bevel gear, a second output bevel gear mounted on said second yoke and driving a third drive shaft, said third drive shaft extending along said second elongated member;

fourth brake means selectively being operable to prevent movement of said second yoke about said second cross shaft;

a wrist assembly mounted at the outer end of said second elongated member including a third gear housing rotatably mounted with respect to and about the axis of said second elongated member, said third drive shaft being drivably connected to a third drive bevel gear in said third gear housing;

a third cross shaft mounted on said third gear housing and having a third axis substantially perpendicular to and intersecting the axis of said third drive shaft;

a third yoke mounted on said third cross shaft, said third yoke having a base member rotatably mounting a third output shaft about an axis perpendicular to the axis of the third cross shaft and intersecting the third cross shaft axis at the same point as the intersection of the axis of the third drive shaft with the axis of the third cross shaft;

fifth, sixth and seventh selectively operable brake means to selectively control the relative movement of said third gear housing with respect to the second elongated member; the third yoke with respect to the third cross shaft; and the third output shaft with respect to the third yoke; and each of the brake means having first and second portions connected between the respective elements it brakes and means to selectively prevent movement between said first and second portions.

11. The apparatus as specified in claim 10 wherein said brake means comprise electromagnetic operable brakes having at least a portion that can be energized to selectively hold a second portion relative thereto.

12. A robot joint comprising a support;

a single drive shaft, said drive shaft being drivably mounted on said support for rotation about a first axis;

a gear housing rotatably mounted relative to said drive shaft and said support and including a cross shaft perpendicular to the first mentioned drive shaft;

a yoke mounted on said cross shaft and rotatable relative thereto;

a third shaft generally perpendicular to said cross shaft, and having an axis lying in a plane with the drive shaft perpendicular to the cross shaft;

first and second gears drivably mounted on said drive shaft and on said third shaft, respectively, and a coupling gear on said cross shaft for drivably connecting said first and second gears; and first, second and third brake means each having first and second portions connected between the respective elements it brakes and means operable between the respective brake portions to selectively control rotation of said gear housing relative to the support, said yoke relative to the cross shaft and said third shaft relative to the yoke about their respective axes.

* * * * *